(12) United States Patent
Hasshi et al.

(10) Patent No.: US 6,641,153 B1
(45) Date of Patent: Nov. 4, 2003

(54) ENGINE ROOM ARRANGEMENT

(75) Inventors: Suehiro Hasshi, Wako (JP); Toshiki Takahashi, Wako (JP); Toshiya Hasegawa, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 55 days.

(21) Appl. No.: 09/040,361

(22) Filed: Mar. 18, 1998

(30) Foreign Application Priority Data

Mar. 21, 1997 (JP) .............................................. 9-068244
Mar. 21, 1997 (JP) .............................................. 9-068727

(51) Int. Cl.[7] ................................................. B60G 3/20
(52) U.S. Cl. .............................. 280/124.135; 180/312; 180/297
(58) Field of Search ................................. 180/312, 291, 180/297, 232; 280/93.51, 93.512, 93.513, 93.514, 93.515, 124.145, 124.146, 124.154, 124.134, 124.135

(56) References Cited

U.S. PATENT DOCUMENTS 3,638,748 A * 2/1972 Tixier .......................... 180/232
5,040,634 A * 8/1991 Moriyama et al. .......... 180/297
5,531,291 A * 7/1996 Sato et al. ................... 180/297
5,873,587 A * 2/1999 Kawabe et al. ....... 280/124.135

* cited by examiner

Primary Examiner—Paul N. Dickson
Assistant Examiner—Tony Winner
(74) Attorney, Agent, or Firm—Armstrong, Westerman & Hattori, LLP

(57) ABSTRACT

The wheel suspension system is dimensioned and positioned so as to be contained within a fore-and-aft profile of the engine assembly so that the wheel suspension system which is considered to be too rigid to define a crush zone in case of a vehicle crash is contained within the profile of the engine assembly, and would not in any way reduce the crush zone of the vehicle body which is effective in absorbing the impact energy of a vehicle crash. A steering gear may also be too rigid to define a crush zone. The engine assembly normally projects toward the passenger compartment at upper and lower parts thereof. Therefore, to avoid the steering mechanism from reducing the effective crush zone, the steering gear unit may be placed so as to oppose the recess thus defined in the engine assembly.

4 Claims, 3 Drawing Sheets

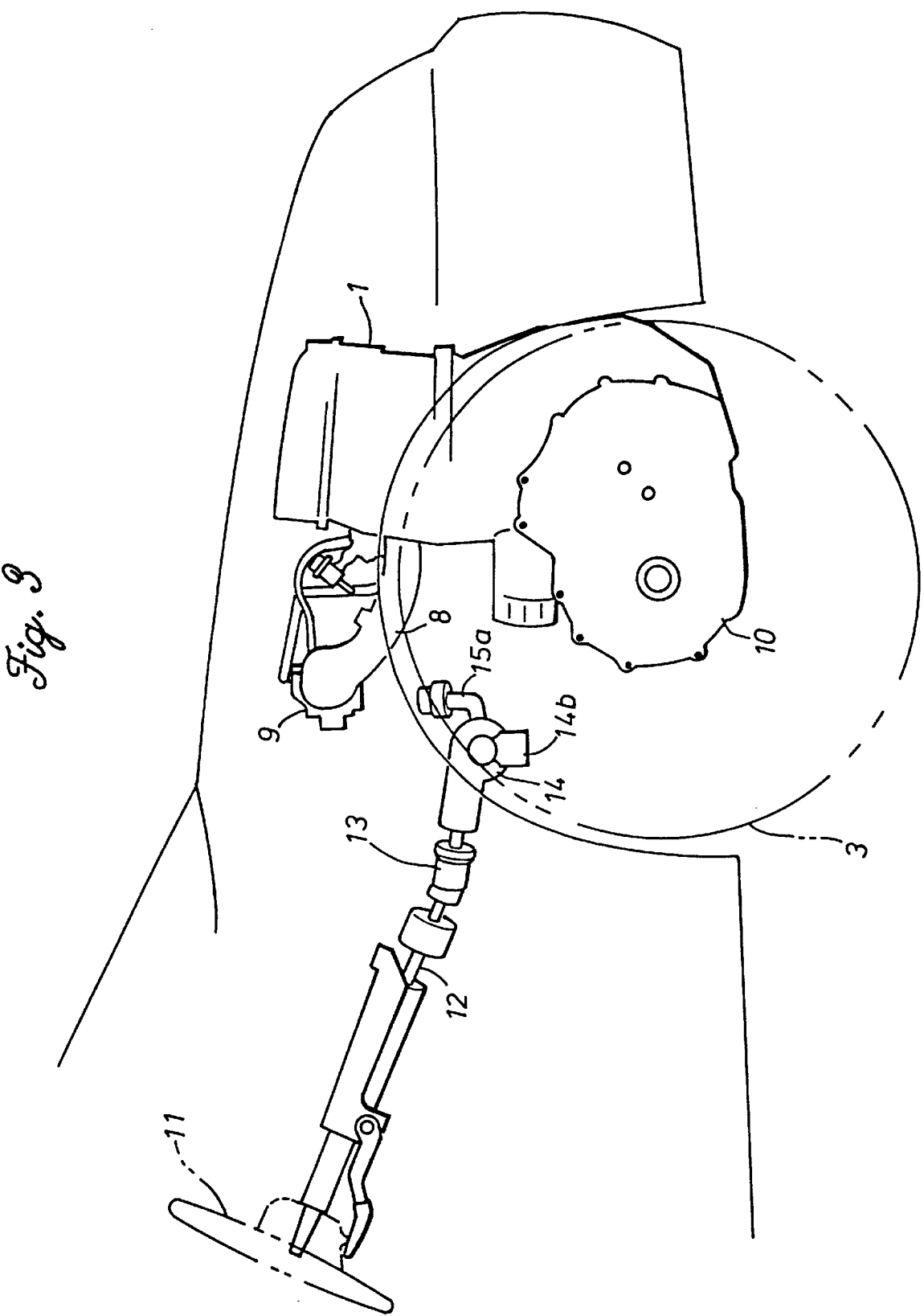

ENGINE ROOM ARRANGEMENT

TECHNICAL FIELD

The present invention relates to an engine room arrangement for a vehicle, and in particular to an engine room arrangement having a controlled crush zone.

BACKGROUND OF THE INVENTION

Modern motor vehicles are mostly designed such that the vehicle body frame may crush in a controlled manner with the aim of reducing the impact of a vehicle crash to the vehicle occupants. For instance, in the case of a motor vehicle having an engine room in a front end of the vehicle body, the engine unit behaves as a substantially rigid body at the time of a vehicle crash, and must be so considered in designing the crush pattern of the front end of the vehicle at the time of a vehicle crash. The engine unit is often incorporated with a transmission unit at a lower end thereof, and the transmission unit may define the extent of the fore-and-aft dimension of the engine/transmission assembly.

The capability of a vehicle body to absorb the impact energy at the time of a vehicle crash can be increased by extending the length of the front end of the vehicle, but this approach is incompatible with the desire to reduce the dimension of the vehicle body without reducing the space for the vehicle occupants. This inevitably requires the space for the engine room to be reduced. It is therefore important to maximize the available crush stroke of the engine room without increasing the length of the engine room.

In addition to the engine assembly, the wheel suspension system consists of relatively rigid members, and tends to be resistant against crushing. Similarly, the steering assembly also tends to be resistant against crushing. Conventionally, it was therefore necessary to deduct the dimensions of the wheel suspension system and the steering gear unit from the available crush stroke of the vehicle body, and there have been some difficulty in ensuring a sufficient crush stroke without undesirably increasing the length of the engine room and thereby reducing the available space for the passenger compartment.

BRIEF SUMMARY OF THE INVENTION

In view of such problems of the prior art, a primary object of the present invention is to provide an engine room arrangement for a vehicle which minimizes the fore-and-aft dimension of the engine room of the vehicle while ensuring a sufficient crush stroke to ensure a required capability to absorb the impact energy of a vehicle crash.

A second object of the present invention is to provide an engine room arrangement for a vehicle which maximizes the capability of the vehicle body to absorb the impact energy of a vehicle crash without imposing any restriction on the design of the various functional assemblies provided in and around the engine room.

According to the present invention, these and other objects can be accomplished by providing an engine room arrangement for a vehicle body having a controlled crushable zone, comprising: an engine assembly mounted on a vehicle body in a lateral orientation; and a wheel suspension system arranged on either side of the vehicle body; the wheel suspension system being dimensioned and positioned so as to be contained within a fore-and-aft profile of the engine assembly.

Thus, the wheel suspension system which is considered to be too rigid to define a crush zone in case of a vehicle crash is contained within the profile of the engine assembly, and would not in any way reduce the crush zone of the vehicle body which is effective in absorbing the impact energy of a vehicle crash. In particular, in view of optimizing the mechanical stability of the wheel suspension system, it is desirable to maximize the fore-and-aft dimension thereof. It may be therefore preferable in some cases if the wheel suspension system is dimensioned and positioned so as to substantially coincide with the fore-and-aft profile of the engine assembly. For instance, the wheel suspension system comprises a lower arm having a base end pivotally attached to the vehicle body, and the base end defines a fore-and-aft dimension of the wheel suspension system.

A steering gear may also be too rigid to define a crush zone. To avoid the steering mechanism from reducing the effective crush zone, the engine assembly may comprise an engine unit and a transmission unit which is disposed under the engine unit so as to project toward a passenger compartment of the vehicle body, the steering gear unit being placed so as to oppose a recess defined above the transmission unit. Also, the upper end of the engine assembly often projects toward the passenger compartment due to the presence of an intake manifold. It is therefore preferable in such a case to place the steering gear unit so as to oppose a recess defined between the intake manifold and the transmission unit.

The tie rods conventionally extended along a relatively low part of the engine room, and therefore interfered with the transmission unit in case of a vehicle crash. Therefore, the wheel suspension system may comprise a knuckle arm extending upwardly so that the tie rod may extends substantially horizontally a relatively a high elevation between a free end of the knuckle arm and an output end of the steering gear unit. If conventional knuckle arms are used, the tie rods may then extend obliquely from the free end of the knuckle arms which are located at relatively low points to an output end of the steering mechanism which is located at a relatively high point.

BRIEF DESCRIPTION OF THE DRAWINGS

Now the present invention is described in the following with reference to the appended drawings, in which:

FIG. 3 is a schematic side view of the engine room arrangement of FIG. 1.

DETAILED DESCRIPTION OF THE PREFERRED EMBODIMENTS

Figure 1:
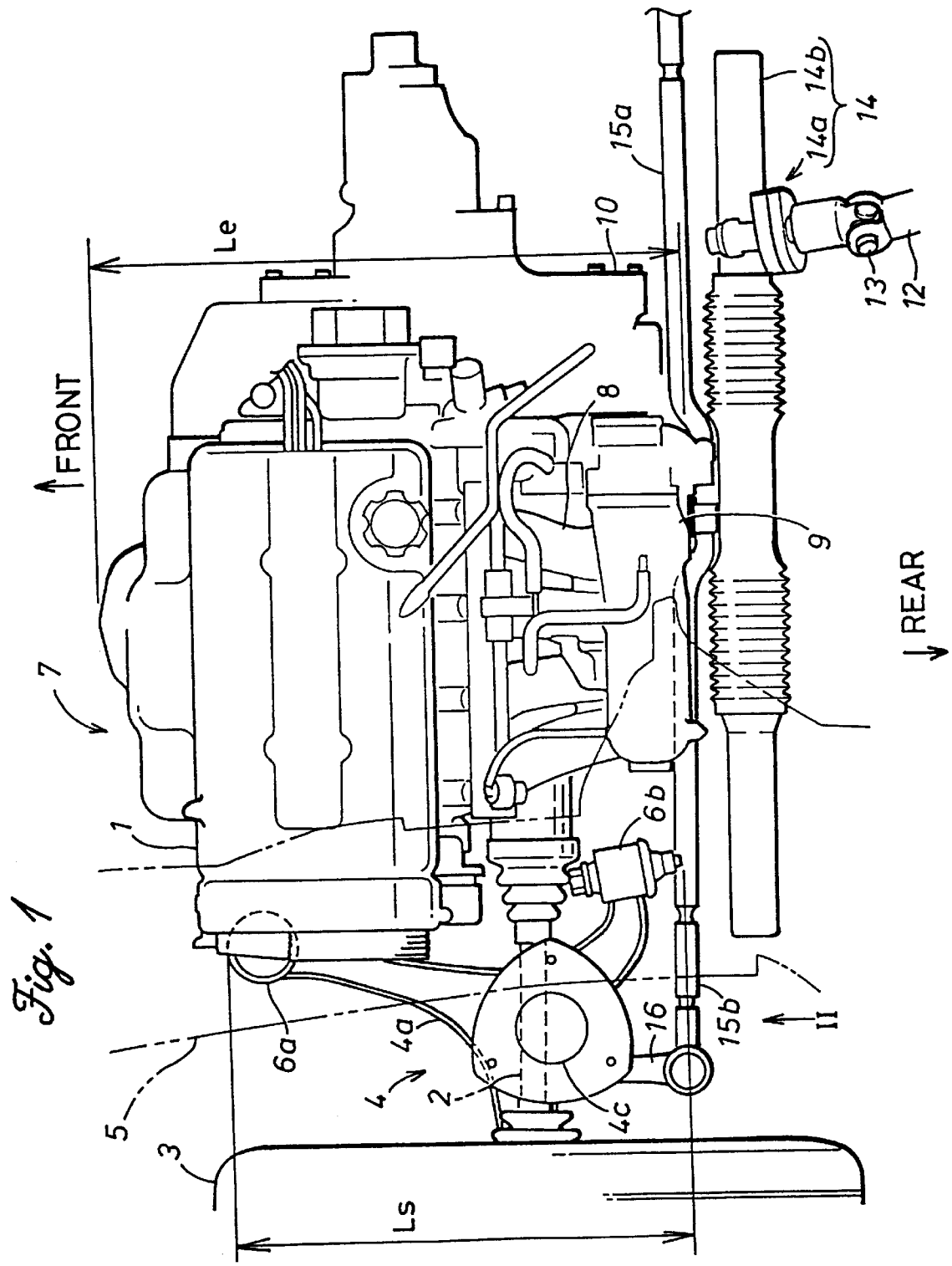
FIG. 1 is a fragmentary schematic plan view of an engine room arrangement including an engine assembly embodying the present invention.
Figure 2:
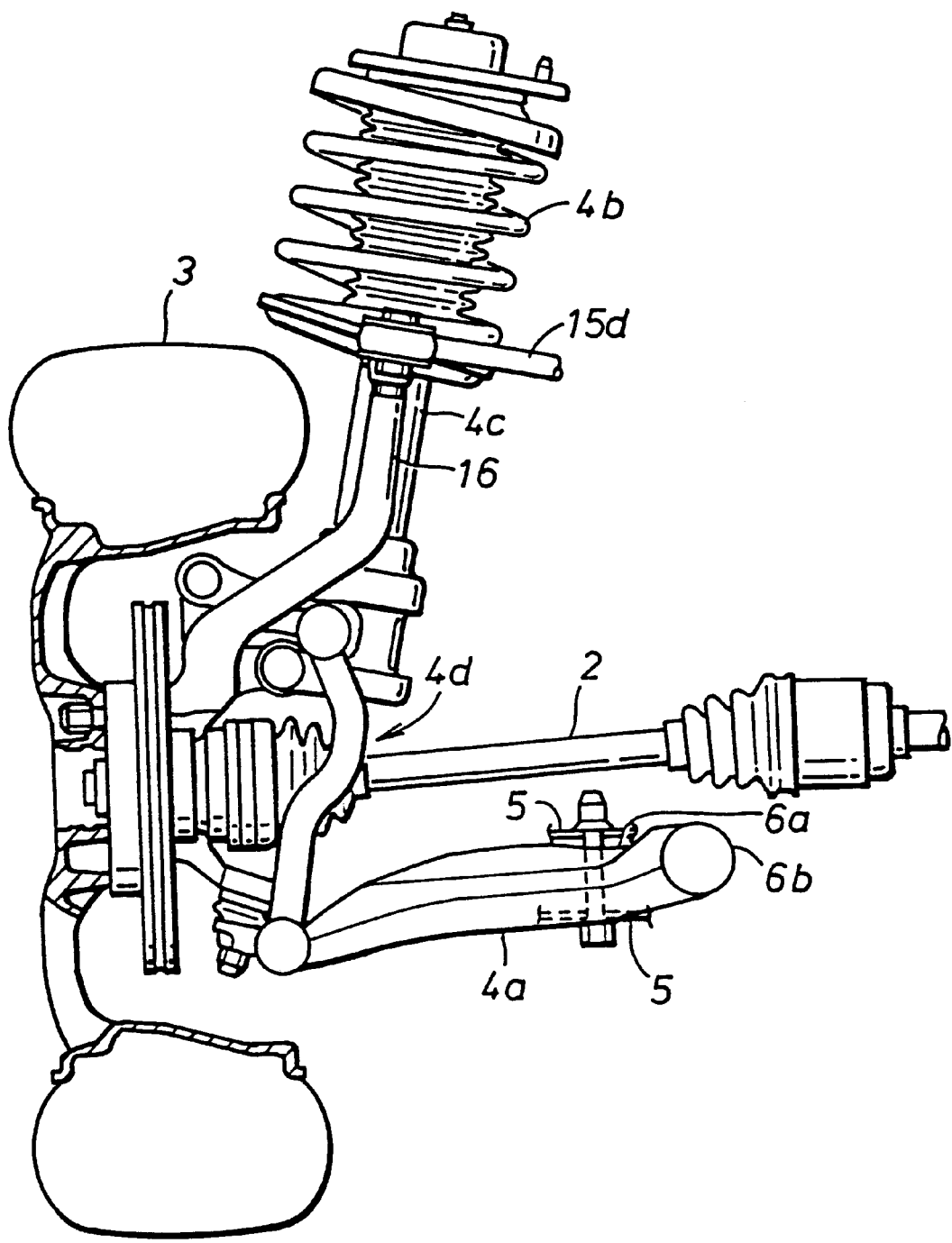
FIG. 2 is a front view of the wheel suspension system of the engine room arrangement of FIG. 1.

FIGS. 1 and 2 illustrate a part of the engine room arrangement for a front engine, front drive vehicle. The engine unit 1 is mounted on the vehicle body in a lateral arrangement with its crankshaft extending in parallel with an axle 2 of a front wheel 3, and is integrally combined with a transmission unit 10 which in turn includes a transmission system and a differential system. The wheel 3 is driven by the axle 2 extending laterally from the transmission unit 10.

The front wheel 3 is supported by the vehicle body via a wheel suspension system 4. The wheel suspension system 4 comprises a lower arm 4a extending between a side frame 5 and a wheel carrier rotatably supporting the front wheel 3, a coil spring 4b interposed between a part of a front fender and the wheel carrier or the lower arm 4a, a linear damper 4c extending coaxially inside the coil spring 4b to cooperate therewith in a known manner, and a multi link mechanism 4d. For more details of this wheel suspension system, reference should be made to copending U.S. patent application Ser. No. F563-09/040,280 filed Mar. 18, 1998 and Ser. No. F564-09/042,800 filed Mar. 17, 1998, the contents of which are hereby incorporated in the present application by reference.

The lower arm 4a has a bifurcated base end which is pivotally attached to the vehicle body at two points. These two points are spaced from each other in the fore-and-aft direction of the vehicle body. The front point 6a is pivotally attached to the side frame 5 via a pivot shaft extending vertically, and the rear point 6b is pivotally attached to the side frame 5 via a pivot shaft extending in the fore-and-aft direction of the vehicle body. The front end of the engine unit 1 is provided with an exhaust manifold 7, and the rear end of the engine unit 1 is provided with an intake manifold 8 and a surge tank 9.

A steering shaft 12 extends from the passenger compartment of the vehicle into the engine room, and the front end of the steering shaft 12 is connected to the input end of a rack-and-pinion gear box 14a of a steering mechanism 14 via a universal joint 13. The rack 14b of the steering mechanism 14 extends in the lateral direction of the vehicle body. An output end of the steering mechanism 14 is connected to the base ends of a pair of tie rods 15a and 15b of a steering linkage mechanism 15, and the free ends of the tie rods 15a and 15b are connected to the knuckle arms 16 of the right and left front wheels 3 (only the left front wheel 3 and the knuckle arm 16 for the left front wheel 3 are illustrated in FIG. 1)

As more clearly shown in FIG. 3, the steering mechanism 14 and the steering linkage mechanism 15 are placed at a height which is intermediate between the intake manifold 8 and the transmission unit 10. This position is somewhat higher than the conventional arrangement, and is made possible by the arrangement in which the knuckle arm 16 extends vertically by a certain distance as best illustrated in FIG. 2. The upper part of the engine unit 1 projects rearward due to the presence of the intake manifold 8 and the surge tank 9, and the transmission unit 10 projects more rearward than the main part of the engine unit 1. Therefore, the steering mechanism 14 and the steering linkage mechanism 15 oppose a recess defined between the upper and lower parts of the engine assembly which includes the engine unit 1 and the transmission unit 10.

In a front engine, front drive vehicle, the engine assembly which may include the engine unit 1 and the transmission unit 10 essentially behaves as a non-crushable rigid body in case of a vehicle crash. Therefore, the crush stroke of the deformation of the side frame that is required to absorb the impact energy of a vehicle crash must be accommodated by the length of the front part of the vehicle body minus the fore-and-aft dimension of the engine assembly. According to this embodiment, the fore-and-aft dimension of the front wheel suspension system, which is given by the two points 6a and 6b of pivotal attachment at the base end of the lateral arm 4a is smaller than the fore-and-aft dimension of the engine assembly Le, and is encompassed by the latter. Although the wheel suspension system is also substantially rigid, and is ineffective as a crush zone for the vehicle body, because the fore-and-aft dimension of the front wheel suspension system does not add to the ineffective length of the vehicle body for the crush zone, the front wheel suspension system would not reduce the crush zone of the front part of the vehicle in any way.

To maximize the rigidity and the mechanical strength of the wheel suspension system, it is desirable to increase the two points of pivotal attachment at the base end of the lateral arm. It is therefore advantageous to make the fore-and-aft expanse of the wheel suspension system to substantially coincide with that of the engine assembly in terms of maximizing both the mechanical stability of the wheel suspension system and the crush zone of the vehicle body.

Referring to FIG. 3, the steering mechanism 14 and the steering linkage mechanism 15 which are considered to be too rigid to define a crush zone are placed at a height which is intermediate between the intake manifold 8 and the transmission unit 10 as mentioned earlier. Typically, a lower part and an upper part of the engine assembly project toward the passenger compartment, thereby defining a recess in an intermediate part of the engine assembly. Therefore, according to the illustrated arrangement, in case of a frontal vehicle crash, as the front end of the vehicle body such as the side frames 5 crushes, the steering mechanism 14 and the steering linkage mechanism 15 can fit into this recessed part of the engine assembly. In other words, the steering mechanism 14 and the steering linkage mechanism 15 would not reduce the crash zone of the vehicle body.

In this embodiment, the knuckle arms 16 extended vertically to place the tie rods 15a and 15b at a relatively high location, but it is also possible to use normal knuckle arms and extend the tie rods obliquely to a steering gear mechanism which is placed at a required high location.

Although the present invention has been described in terms of a preferred embodiment thereof, it is obvious to a person skilled in the art that various alterations and modifications are possible without departing from the scope of the present invention which is set forth in the appended claims. For instance, the engine room arrangement of the present invention may be applied to a rear engine, rear drive vehicle without any substantial modification. In such a case, the steering mechanism would be present only if the rear wheels of the vehicle are also steerable.

What is claimed is:

1. An engine room arrangement for a vehicle body having a controlled crushable zone, comprising:

an engine assembly mounted on a vehicle body in a lateral orientation; and a steering gear unit; and a wheel suspension system arranged on either side of said vehicle body, wherein said wheel suspension system is dimensioned and positioned so as to be contained within a fore-and-aft profile of said engine assembly, and wherein said engine assembly comprises:

an upper engine portion including an intake manifold projecting rearward toward a passenger compartment of said vehicle body; and a lower engine portion including a transmission unit, wherein said transmission unit is connected to wheels of said wheel suspension system via axles arranged behind said crankshaft of said engine, and wherein said lower engine portion is disposed substantially below said upper engine portion such that said transmission unit projects rearward toward said passenger compartment of said vehicle body and forms a recess between said upper engine portion and said transmission unit, said steering gear unit being placed behind said engine assembly so as to oppose said recess such that said steering gear unit fits within said recess during a frontal collision.

2. An engine room arrangement for a vehicle according to claim 1, wherein said wheel suspension system is dimensioned and positioned so as to substantially coincide with the fore-and-aft profile of said engine assembly.

3. An engine room arrangement for a vehicle according to claim 1, wherein said wheel suspension system comprises a lower arm having a base end pivotally attached to said vehicle body, and said base end defines a fore-and-aft dimension of said wheel suspension system.

4. An engine room arrangement for a vehicle according to claim 3, wherein said wheel suspension system comprises a knuckle arm extending upwardly, and a tie rod extends substantially horizontally between a free end of said knuckle arm and an output end of said steering gear unit.

* * * * *